Figure 1:
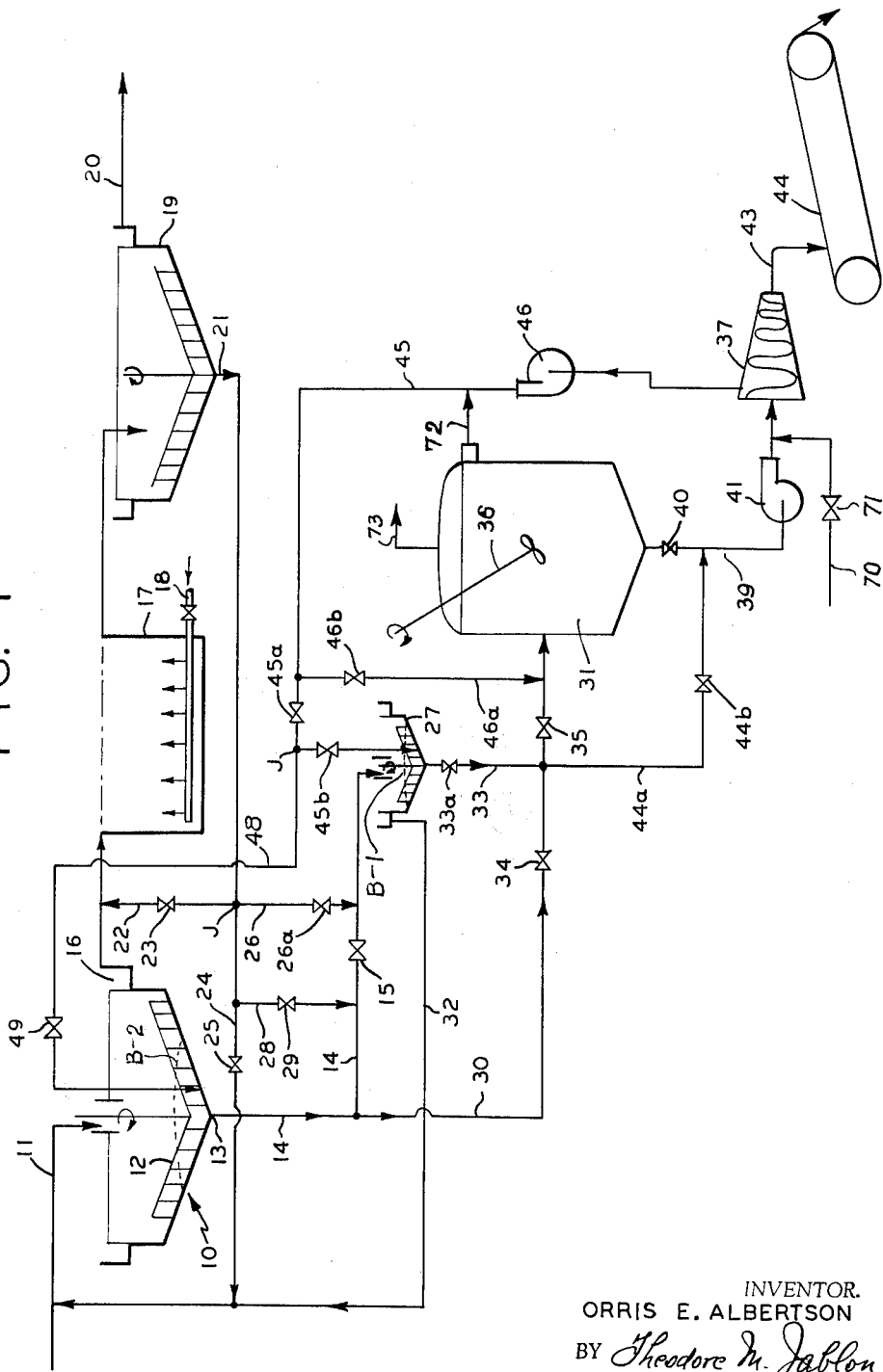

INVENTOR.
ORRIS E. ALBERTSON
BY Theodore M. Jablon
ATTORNEY.

April 26, 1966 O. E. ALBERTSON 3,248,323
WASTE TREATMENT WITH ANAEROBIC DIGESTION
Filed Nov. 16, 1964 3 Sheets-Sheet 2

INVENTOR.
ORRIS E. ALBERTSON
BY Theodore M. Jablon
ATTORNEY.

April 26, 1966     O. E. ALBERTSON     3,248,323

WASTE TREATMENT WITH ANAEROBIC DIGESTION

Filed Nov. 16, 1964     3 Sheets-Sheet 3

INVENTOR.
ORRIS E. ALBERTSON
BY Theodore M. Jablon
ATTORNEY.

United States Patent Office 3,248,323
Patented Apr. 26, 1966

3,248,323
WASTE TREATMENT WITH ANAEROBIC
DIGESTION
Orris E. Albertson, Norwalk, Conn., assignor to Dorr-Oliver Incorporated, Stamford, Conn., a corporation of Delaware
Filed Nov. 16, 1964, Ser. No. 411,971
23 Claims. (Cl. 210—6)

This is a continuation-in-part of patent application Serial No. 217,041, filed Aug. 15, 1962.

This invention relates to the disposal treatment of waste sludges, for example, sewage sludge, trade wastes, or the like, through anaerobic digestion effecting the destruction of organic matter in the sludge by way of bacterial conversion into gas.

It is among the objects of this invention to provide a simple low-cost highly compact anaerobic sewage sludge digestion system of high digestion efficiency and improved digester tank utilization, so that with a minimum of tank volume the system is operable economically at high volatile solids loading rates and maximum gas recovery.

More particularly, this invention aims to provide a digestion system operable at volatile solids or organics loading rates significantly higher than those that are now applicable to, or can be handled safely by conventional digestion systems, yet capable of delivering a well digested inoffensive sludge comparable for instance to digested sludge derived from a properly operated conventional two-stage digestion system.

Another aim of the invention is to provide for the discharge from the system of a well-digested sludge which is also well dewatered or concentrated and readily disposable, even while operating the digester at those economically high organics loading rates.

Another object is to provide a digestion system that is readily controllable as to quality of the products of digestion.

Physically, raw sewage sludge presents the appearance of a lumpy, slimy, viscous and malodorous mass wherein the undigestible matter including the inorganics such as ash and sand appear entrapped in, and coated by the digestible organic matter, whereas the digested sludge contains the undigestible matter, so as to speak, as a skeleton from which the organic burden or flesh has been removed by the bacterial conversion thereof into gas. The digestible or gasifiable solids are represented mainly by the basic components proteins, carbonaceous matter, carbohydrates, grease and fats, whereas the undigestible solids comprise largely cellulosic matter, sand and the like.

A generally acceptable inoffensive digested sludge, however, should be digested sufficiently to be non-odorous, a requirement usually met by a sludge wherein about 90% to 95% of the gasifiable volatile matter has been digested by conversion to gas, with the remaining ungasifiable and inoffensive sludge solids usually representing about 50% of the total solids present in the raw undigested sludge.

Raw sludge is usually pumped from the bottom of the liquid body in the clarifiers where it is outwardly inoffensive, into the digestion system from which in turn it is delivered and exposed to the outer environment only after having lost its offensiveness, in the form of digested sludge. Thereafter, the digested sludge usually at a solids concentration in the order of 5%, is frequently subjected to filtration on a continuous drum filter requiring considerable maintenance as well as substantial quantities of coagulating filter aid material in order that a filter cake of a usual solids concentration in the order of 25% to 30% may be obtained for further disposal, while filtrate liquor is recirculated to the clarifiers for retreatment usually along with the supernatant liquor derived from the secondary tank or stage of conventional digestion systems. Sand drainage beds receiving normally digested sludge which has a solids concentration of about 5%, and straight haulage are alternative cumbersome means for disposing of digested sludge, which this invention aims to eliminate. The elimination of the drainage beds in particular provides extra plant space while doing away with periodical bed cleaning operations and the removal of the dried sludge therefrom.

In the conventional two-stage digestion system the primary digestion stage or tank normally carries nearly the entire burden of digestion whereby the offensive organic solids are converted into gas while in a state of agitation. The secondary stage or tank receiving transfer sludge from the primary tank performs its major function of separating supernatant liquor, so-called digester supernatant, under conditions of quiescence.

But various conditions and limitations must be observed in the conventional digestion operation in order to sustain adequate or optimum performance, all directed towards producing a fully digested sludge as well as a supernatant liquor of a quality best suited for retreatment by recirculation, such as to minimize the total burden on the treatment facilities and to provide optimum overall efficiency of the treatment plant as a whole. Accordingly, certain requirements as to adequately large tank volume in the digestion system have had to be met to insure its proper operation.

Accordingly, the dimensioning of the primary digestion tank is governed by the requirement that the resulting sludge be sufficiently digested for releasing supernatant liquor in the secondary stage, and to be inoffensive in the process of further disposal. The secondary digestion stage or tank in turn must be large enough so as to be capable of receiving the transfer sludge from the primary tank and holding it in a quiescent stage long enough to separate the supernatant liquor in spite of any disturbing effects arising due to conversion of remaining organic matter into gas.

Moreover, in the operation of the conventional digestion system, the raw sludge feed should not be too dilute for the reason that the alkalinity concentration normally present as a product of digestion is then lowered below the level required to sustain digestion, so that favorable bacterial environment is then lost. Also, batch-wise feeding of raw sludge at relatively large intervals is usually necessary in order to encourage the formation of supernatant liquor during the intervening periods of quiescence in the secondary stage.

Consequently, in the conventional digestion system, the required tank volume is very large, that is large enough not only to absorb fluctuations in the rate of feed and concentration of the raw sludge, but also large enough to be capable of withstanding the long interruptions in feed supply due to batch feeding operation. Also, the tank volume has had to be adequate to provide prolonged detention of the large quantity of water contained in the dilute raw sludge entering the tank to allow for adequate digestion. At any rate, the dimensioning and the operation of the digestion system were governed by the problem of satisfactory supernatant separation, as well as by the rate at which volatile organic matter could be converted into gas under the conditions prevailing in the digesting mass.

In view of the foregoing conditions governing the operation of the conventional digestion systems, one obstacle to increasing the volatile solids loading rate by increasing the feed rate of the raw sludge is due to the fact that the transfer sludge displaced by the feed from the first stage of the system will carry increasing amounts of undigested solids into the secondary stage, whereby the quiescence necessary for the separation of the supernatant liquor is made impossible. This in turn would make it necessary to allow for even larger periods of feed interruption.

Another hindrance to increasing the digester loading rate is the displacement of and loss from the digester of increasing amounts of alkalinity in the liquor, which alkalinity is necessary for maintaining a favorable environment for sustaining the biological life responsible for the destruction of the organic matter by conversion into gas. This alkalinity formed in the digestion process derives mainly from the biochemical decomposition of protein substances, resulting in the formation of ammonium bicarbonate. If this alkalinity is displaced in the digested sludge by the incoming raw feed sludge faster than the alkalinity can be formed, then the concentration of alkalinity will decrease and may reach a critically low level where the bacterial organisms responsible for digestion will no longer survive and the digestion process will fail.

Another obstacle to increasing the digester loading rate in conventional digester systems lies in the character of the composition of the raw sludge, in that some of the components, especially the aforementioned grease and fats, require a great deal longer to digest than others such as the proteins. The composition of the organic matter in raw primary clarifier sludge is generally about 16% to 20% protein, 18% to 25% grease and 50% to 60% carbohydrates. The carbohydrates include both simple and complex compounds such as cellulose which is very difficult to break down under anaerobic conditions, whereas the simpler compounds such as sugars are rapidly reduced. About 50% to 60% of the organic nitrogen (assumed to be protein) is very rapidly hydrolyzed to organic acids and ammonia nitrogen. The organic acid are then converted to $CO_2$ and $CH_4$. The remainder of the organic nitrogen is relatively stable and likely represents anaerobic cell tissue. But there is evidence that among the sludge components, grease requires the longest detention time for effecting its decomposition into $CO_2$ and $CH_4$ in conventional digesters. Also, grease and fats, while capable of producing a large proportion of the gas and one that is of high quality, are also the most undesirable to handle and the most putrescible. Therefore, it is most desirable to have the grease completely hydrolyzed in the anaerobic digestion process, and a correspondingly long detention time in terms of tank volume is therefore normally provided in adequately dimensioned conventional two-stage digestion systems.

The invention provides an improved digestion system which eliminates substantially all of the foregoing limitations and obstacles that lie in the path to significantly increasing the digester loading rate and minimizing the tank volume requirements, even though producing a well digested sludge which is also well digested and readily disposable.

The foregoing objectives of the invention are attainable in an improved digestion system the operation of which is so controlled that the effective detention time in the digester of the gasifiable organic substance is greatly increased relative to the detention of the liquor, that is, the solids detention time is rendered independent of the liquid detention time. More particularly, the slow digesting raw sludge components, such as the grease and fats, are selectively given a longer detention time needed for their eventual digestion and conversion into gas. The net result is that a significantly higher organics loading rate with greater bacterial feed concentration and greater bacterial density is maintainable in the digesting mass along with an adequate alkalinity concentration in the liquor necessary for digestion. At the same time there is a maximum recovery of gas in a minimum of digestion space.

To that end, in a preferred embodiment, the invention provides a treatment system wherein dilute raw sludge, for example sludge supplied from a clarifier operation, is subjected to a continuous sedimentation thickening operation in a thickener tank, so controlled that a bed of substantial depth of thickened sludge is maintainable therein providing a reservoir of thickened sludge to be supplied to the digester contents which latter preferably is kept in a state of mechanically induced mixing and agitation.

The loading of the digester is such that incompletely digested sludge is withdrawn from the body of digesting sludge. This sludge from the digester is subjected to a treatment in a solid bowl type centrifugal machine capable of effecting the separation thereof into a moist cake fraction and a liquid overflow fraction. In the operation of this machine, the cake material discharging at the narrow end of the bowl contains substantially none of the undigested matter and is therefore readily disposable, while the overflow liquor containing substantially all of the digestible organic or gasifiable matter including the fats discharges from the wide end of the bowl. This latter overflow fraction from the centrifuge is then subjected to a dewatering operation, and the undigested solids along with the residual water are then returned to the body of digesting sludge for conversion into gas.

This dewatering operation is carried out preferably by way of feeding the undigested solids directly into the sludge bed in the aforementioned thickening tank, causing the solids to be entrapped in the thickened sludge while separated liquor from those solids reaches the thickener overflow together with the separated liquor resulting from the thickening operation.

The undigested solids contained in the centrifuge overflow are thus recirculated into the digester through the thickener whereby the digester loading and the digestion efficiency are correspondingly increased to a point where an optimum balanced condition in the digester operation is attainable. Hence, in this digester circuit (that is the digester operating in circuit with the centrifuge and the sludge bed in a settling tank) the gas-producing efficiency of the available digester volume is thus substantially increased, even as a fully digested as well as highly concentrated sludge is delivered for disposal from the centrifuge, while a safe degree of alkalinity concentration is maintained in the digester. In this way, higher digester efficiency and utilization of the available digester tank volume, are attainable at practically no extra cost by way of operating the digester circuit in the manner above set forth.

However, where a thickening station such as above set forth is not available or is out of service, the invention provides that for example a primary clarifier tank of the treatment system may be operated in such a manner that a bed of thickened sludge is maintainable therein as in a sump. This clarifier tank may be similarly equipped with induction conduit means on the rotary rake structure for discharging the recirculated undigested solids directly into the bed of sludge.

According to certain features provision is made for maintaining optimum loading and digestion conditions in the digester connected in circuit with the centrifuge and with the sludge bed in the thickener or settling tank.

According to one feature, where the digester circuit is to be operated only during certain periods, the centrifuge during such periods must handle a volume of digester sludge correspondingly greater than the rate of continued input of thickener sludge into the digester. Therefore, a portion of the centrifuge overflow, namely as much as is necessary for maintaining the required liquid level in the digester tank, is recirculated directly to the digester, bypassing the thickener. During the interim periods between centrifuge operations, overflow or excess from the digester may be returned to the clarifier.

According to another feature, since finely divided digested matter may build up in this digester circuit, provision is made for avoiding or relieving the circuit of an excess load or congestion due to such recirculating fines. Accordingly, the invention provides for the introduction of a flocculating agent into the incompletely digested sludge entering the centrifuge to encourage the coalescence or coagulation of those fines so they will pass from the centrifuge along with the cake material instead of being recirculated through the overflow from the machine.

According to still another feature, if during the normal operation of the centrifuge an undesirable amount of relatively coarser digested or undigestible or inert matter should have accumulated in the digester circuit to hamper the digestion process, such matter may be purged quickly from the system by greatly increasing, for a short period, the rate of feeding digester sludge into the centrifuge, while allowing the overflow fraction from the centrifuge to be returned directly to the digester. During this period, with the clarifiers and the thickener continuing to operate, said purged out matter is delivered in the cake material, while the digestible matter and fines are temporarily detained by being displaced through the overflow of the machine back intot the digester.

As herein illustrated, the rotary rake structure of thickener or settling tank is utilized for effecting the introduction of the centrifuge overflow directly into the bed of sludge.

Other features and advantages will hereinafter appear.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 1 is an example of a flowsheet for the treatment of sewage sludge embodying the invention, wherein the digester is operated in circuit with the solid bowl centrifuge and with the sludge bed in the settling tank.

Figure 2:
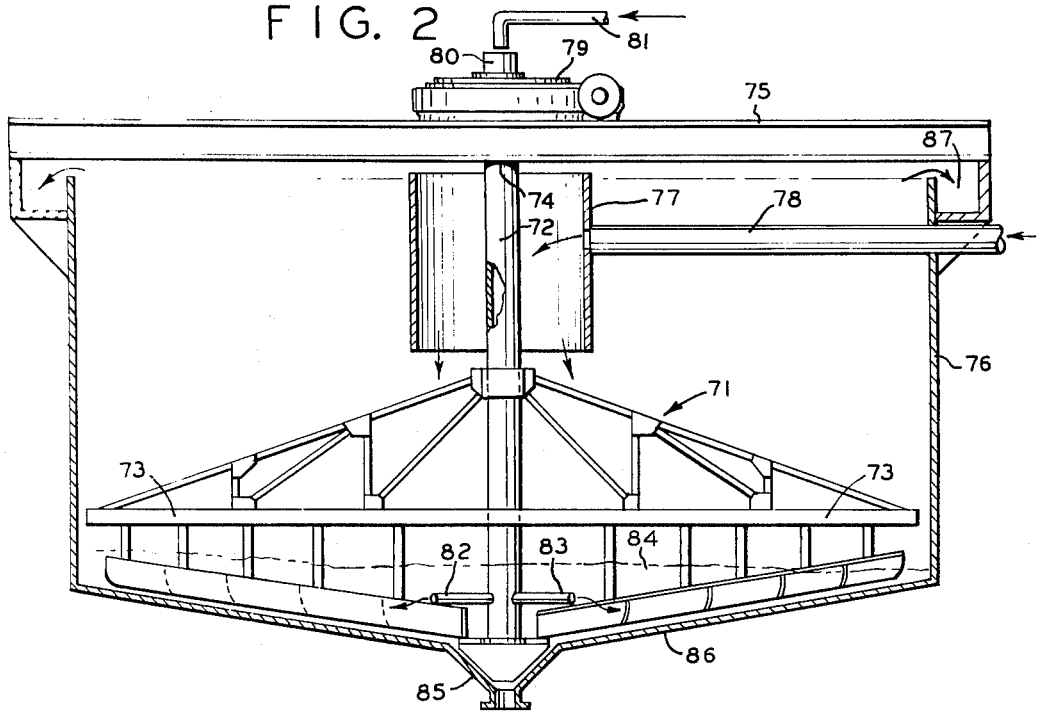
Figure 3:
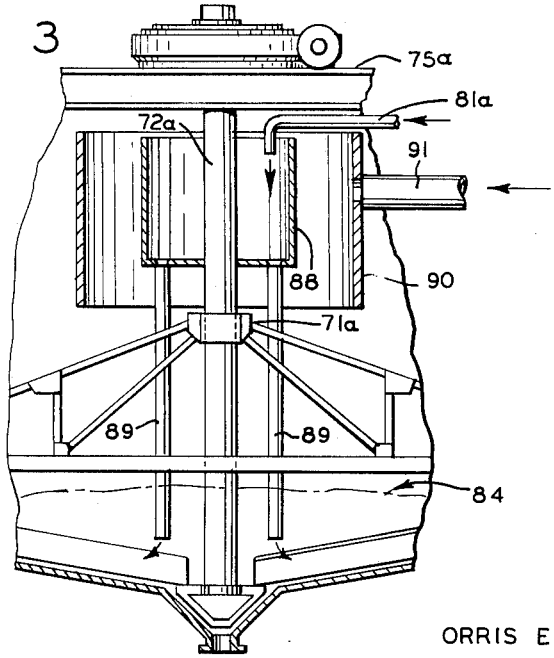
Figure 4:
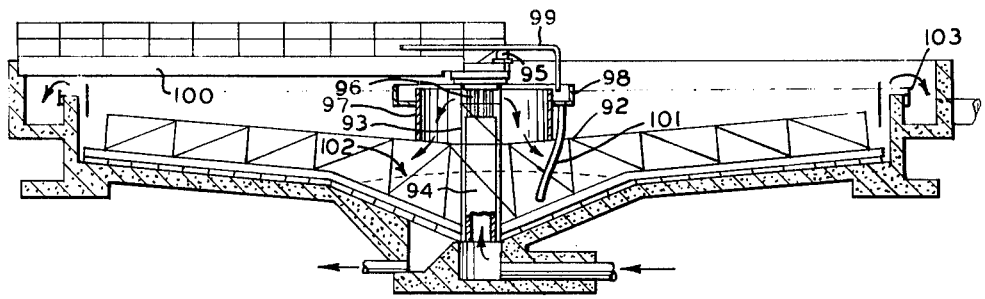

FIGS. 2, 3, and 4 show examples of utilizing the rotary rake structure in the thickener or settling tank for the purpose of introducing the centrifuge overflow into the bed of sludge.

Figure 5:
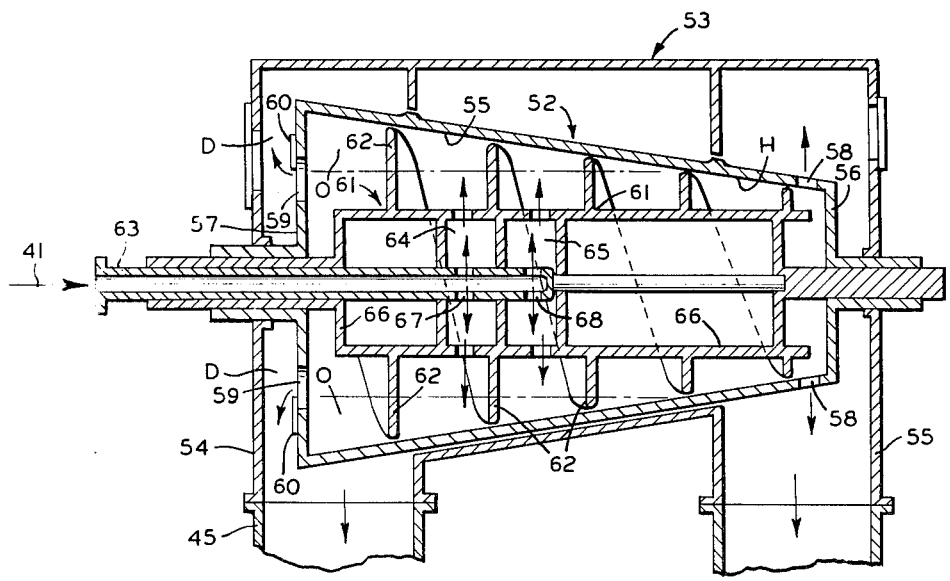

FIG. 5 is a semi-diagrammatic longitudinal section of a solid bowl type centrifugal machine.

As exemplified in FIG. 1 the invention may be embodied in a sewage treatment plant comprising a conventional clarification treatment system for producing raw sludge which may contain primary and secondary clarification sludge in mixture, adapted for treatment in an anaerobic digestion system.

Accordingly, the clarification treatment system in this example comprises a primary clarifier tank unit 10 supplied with raw sewage as indicated by a supply conduit 11, and equipped with the familiar rotary sediment raking structure 12 for conveying primary sludge or sediment to a bottom outlet 13 connected to a sludge discharge conduit 14 provided with control valve 15. The overflow launder 16 of this tank receives primary effluent containing suspended solids that will not settle in the primary tank, but may be subject to further clarification treatment. The primary effluent may be treated biologically, that is by aeration for example in an aeration tank 17 having a controlled air supply indicated at 18. The resulting so-called activated sludge containing the previously non-settleable solids converted into settleable biologic floc structures, is transferred from the aeration tank to a secondary clarifier tank 19 equipped substantially the same as the primary clarifier tank, and delivering secondary purified effluent 20 from the overflow, while secondary sludge is being withdrawn from the bottom zone as through a discharge conduit 21 leading to a juncture J.

From juncture J a branch conduit 22 provided with control valve 23 allows for recirculation of secondary sludge into the aeration tank at a controlled rate governed by the requirements of activated sludge tank operation. Another branch conduit 24 provided with control valve 25 leading from juncture J is operable to divert a portion of the secondary sludge back into the primary clarifier tank by way of the raw sludge influent conduit 11. Another branch conduit 26 leading from juncture J provided with control valve 26a joins the primary sludge discharge conduit 14 downstream of valve 15, whereby mixed primary and secondary sludge may be delivered into a tank 27 which may be in the nature of a thickening tank operated in accordance with the patent to Torpey No. 2,850,449, and further to be described.

The thickened sludge passes to a digestion system including a digester 31. Another branch conduit 28 from line 24 having control valve 29 is shown to join the primary sludge discharge conduit 14 upstream of valve 15 whereby a portion of the mixture of primary and secondary sludge may by-pass the thickening tank 27 via conduit 30 for delivery to the digestion system or via line 44a to the solid bowl machine. Effluent liquor from the thickening tank 27 may be disposed of as by conduit 32 leading back into the primary clarifier tank.

A deep sludge bed of controlled depth maintained in the thickener tank 27 and controlled in accordance with the aforementioned Torpey Patent No. 2,850,449 may serve as a reservoir for supplying the feeding sludge to the digester 31 through underflow discharge connection 33 having control valve 33a. This underflow connection joins the aforementioned conduit 30 at a point between control valves 34 and 35.

The raw sludge fed to the digester 31 may be a mixture of primary and secondary clarifier sludge, which may have been subjected to a concentrating or thickening treatment such as above indicated in tank 27. The thickener sludge mixture is supplied preferably continuously or at short intervals to the digester 31 which in turn is operated in the special manner of this invention affording significantly increased volatile solids loading rates and greatly improved digester tank utilization as will be furthermore set forth. The body of digesting sludge in the digester is kept in a state of enforced agitation as indicated by the agitator 36.

The digester 31 operates in circuit with a solid bowl type centrifugal machine 37 described below as shown in FIG. 5.

The digester 31 has a sludge discharge conduit 39 provided with control valve 40 and has a pump 41 operable to supply incompletely digested sludge to the solid bowl machine 37 at a rate controlled in relation to the rate of sludge feed into the digester tank in a manner furthermore to be set forth.

According to the invention, the operation of the solid bowl centrifugal machine 37 is conducted so as to selectively deliver a largely inert or undigestible solids fraction in the nature of a highly concentrated cake material having a solids concentration in the order of 40%, and a dilute fraction or suspension carrying most of the undigested gasifiable solids present in the incompletely digested sludge. The concentrate or cake fraction representing well digested sludge discharging at 43 may be disposed of in any suitable manner for example as indicated by the conveyor 44. A conduit 44a having a control valve 44b bypasses the digester enabling excess raw sludge to be supplied directly to the solid bowl machine 37.

The overflowing dilute suspension of undigested matter, however, is transferred from the solid bowl machine for further separation treatment to the thickener 27 via a transfer conduit 45 and control valves 45a and 45b by a pump 46. It will be noted that this transfer conduit delivers into the bottom zone or sludge bed B-1 of the thickener wherein the solids thus become trapped, while liquor separating from these solids reaches the thickener overflow together with the overflow resulting from the thickener operation.

A bypass flow connection 46a leads from line 45 to the digester via a control valve 46b, whereby a portion of the centrifuge overflow may be diverted from the thickener delivery directly into the digester for purposes to be described below.

At juncture J the line 45 has a branch line 48 leading through a control valve 49 into a sludge bed B-2 maintainable in the cone bottom of primary clarifier 10. In this instance the clarifier is utilized for getting the transferred undigested solids trapped and retained in the bed of sludge while liquor separates therefrom and reaches the clarifier overflow.

A controllable supply of flocculating chemical 47 is shown for the purpose of introducing such a conditioning agent into the digester sludge entering the centrifuge. This will cause extremely fine digested matter which may be present in excess to form agglomerates or flocs large enough to be contained in the cake material leaving the centrifuge for disposal. Escape of such fine material into the overflow of the machine, if not prevented may produce undue build-up of such fines in the digester circuit, which in turn may reduce digestion efficiency, and also by escaping with the thickener overflow reduce the effectiveness of the clarification operation.

The so-called "solid bowl" centrifugal machine schematically illustrated in FIG. 5, has a rotor structure 52 rotating in a housing 53. The housing has a discharge neck 54 located at the wide end of the rotor structure and connected to the transfer conduit 45 for delivering the overflow fraction containing the undigested gasifiable matter to be subject to further separation treatment. The separated solids or stabilized cake fraction 43 (see FIG. 1) containing mostly undigestible solids leaves the machine through a discharge neck 55 for further disposal in any suitable manner such as indicated by the conveyor 44.

The rotor structure 52 comprises a bowl 55 provided with an end closure plate 56 at the narrow end and an end closure plate 57 at the opposite or wide end thereof. The separated solids or cake fraction representing the digested sludge discharges centrifugally from the bowl through openings 58 provided adjacent to the narrow end of the bowl. The opposite end closure plate 57 has overflow openings 59 associated with adjustable weir plates 60 determining the overflow level of the annular or pool body O of liquid undergoing centrifugal separation in the bowl. Arrows D at the wide end indicate delivery over these weir plates of the liquid fraction or suspension carrying the undigested matter to be further subjected to concentration in the thickener. A part or all of this liquid fraction may be returned directly to the digester through bypass line 46a and control valve 46b.

Within the rotor bowl of this machine there is rotatably mounted a conveyor element 61 conforming to the inner contour of the bowl and adapted to be rotated at a differential speed relative to the rotation of the bowl, so that the spirally shaped flights 62 thereof will move the centrifugally separated solids comprising most of the digested organics, out of the liquid body or pool O to emergence onto the narrow end portion, the so-called beach portion H of the bowl, finally causing the material to discharge centrifugally through the openings 58 for disposal in the form of relatively dry cake material.

The sludge from the digester enters this machine through an axially arranged stationary feed tube 63 introducing feed sludge, for example, into receiving chambers 64 and 65 formed in the hollow hub portion 66 of the flight conveyor element, and then through openings 67 and 68 into the annular liquid body O undergoing centrifugal separation in the bowl.

As applied in the digester operating cycle of this invention, the operation of the solid bowl centrifugal machine receiving the incompletely digested sludge from the digester, may be controlled so as to remove varying amounts of the digestible solids fraction from the incompletely digested sludge. This can be done by adjusting the rate of sludge feed into the machine, as by adjusting the pumping rate from the digester. As the feed rate is increased, the percentage of heavy undigestible matter increases in the discharging cake, while displacing the more digestible volatile matter into the overflow for return into the digester. Such selective displacement is effected since the undigestible volatile matter, for example, cellulose fibers, has a high specific gravity facilitating centrifugal separation, whereas the digestible fats and greases being attached to or occluded in other substances have resulting specific gravities slightly heavier than water. Therefore, substantially all of these fats and greases may be caused to appear in the overflow of this solid bowl machine, the overflow then to be subjected to the above described dewatering operation through the sludge bed in a settling tank.

It is these greases that have the most objectionable characteristics in the digested sludge, and their potential loss accounts for a large loss of digester gas of high quality, since 1 lb. of grease in digestion will produce 23 cu. ft. of gas at 72% $CH_4$. Moreover, as previously indicated, this material normally retards the digestion process as a whole because its destruction or gasification proceeds so much slower than that of the other main components, the carbohydrates and the proteins, yet will produce the bulk of the gas developing after the initial 6 to 10 days of digester detention time. But in the digester operating cycle of this invention, when properly balanced, the required length of grease digestion time can be selectively increased.

The invention provides for controlling the amount of suspended fines that tend to recycle with the centrifuge overflow into the thickener and into the digester. If uncontrolled the amount of fines may build up in the digester circuit so that eventually they would affect the overall treatment plant efficiency when escaping through the thickener overflow and reaching the clarifier overflow. Such build up of fines in the circuit also would impair the digestion efficiency.

Even though the solid bowl centrifugal machine has available such control variables as regulating the pool volume in the bowl by the location of the overflow, the bowl speed, and the configuration of the bowl, there are types of feed sludges where none of the foregoing variables will provide sufficient control of the quantity of recycling fines. In such cases, even the most signficant and most effective factor available for controlling the solids fractionation between cake material and overflow, that is varying or lowering the rate of feed sludge entering the centrifuge, may be inadequate or uneconomical in view of the design capacity of the machine.

In such cases of potential fines build-up the invention provides for the addition of coagulating chemicals, for example alum or organic polyelectrolytes to the feed sludge entering the centrifuge, as indicated by the supply line 70 including control means 71. The resulting coagulation of the digested fines into larger and heavier floc structures will cause them to be incorporated centrifugally into the cake material even with sludge feed rates corresponding to design capacity.

In this way the recovery of such solids or fines in the cake material may be increased to any extent desired. The chemical dosing may be applied intermittently or continuously, depending upon the characteristics of the treatment plant. Intermittent application of the dosing chemical means that dosing is applied only when the amount of solids in the centrifuge overflow exceeds an acceptable amount which in turn is dependent upon the design and operating characteristics of the respective treatment system as a whole.

The invention further provides for delivering at least a portion of the centrifuge overflow directly to the digester at a controllable rate, bypassing the thickener.

This controllable bypass arrangement makes it possible to operate the centrifuge intermittently, for example only 1, 2, or 3 days per week, even though the digester may operate on a 6-day or 7-day schedule. Hence, the volume of digester sludge to be handled by the centrifuge during its operating period may greatly exceed the volume of raw sludge normally pumped to the digester. However, that differential is compensated for through the bypass arrangement 46a and 46b by causing the excess of overflow volume from the centrifuge to be returned directly to the digester, thereby maintaining the sludge level in the digester at its required elevation. During the interim periods between operations of the centrifuge, overflow 72 from the digester may be returned via lines 45 and 48 to the raw sludge clarification station. The gas resulting from the operation of the digester is indicated at 73.

Furthermore, such a bypass connection between the centrifuge and the digester, allows for a mode of operation whereby the digester contents may be purged quickly of an undesirable accumulation of relatively coarser undigested or undigestible material such as crude cellulose or the like occurring in substantial quantity in the raw sludge fed to the digester. This purging of the digester contents is accomplished by operating the centrifuge alternatingly for long periods in circuit with the thickener and with the digester, and for short periods in circuit only with the digester. During the long operating periods when nondigestible cellulosic matter or the like may accumulate in the digester contents, the centrifuge is operated in the normal manner, that is with a feed rate as close as practical to its design capacity, whereby a major portion of the feed solids substantially free of digestible matter is recovered in the discharging cake material, while the remainder comprising largely the undigested matter in the overflow is recycled into the sludge bed of the thickener. The aforementioned coagulating treatment with a chemical may or may not be required during these periods of normal operation. However, during the intervening short periods the centrifuge is operated at a feed rate which greatly exceeds the rate necessary for removing the organic solids. Accordingly, with quantities of the finer digested or inert matter thus being displaced into the overflow of the centrifuge, the solids recovery in the cake material will be only about 20% to 50% of normal, with the cake material containing mainly the solids of relatively high specific gravity, namely those of high ash content and of cellulosic character. Such periodical removal or purging in the digestion process, is effected without impairing the required degree of alkalinity in the digester contents. During the relatively short purging periods, the supply of raw sludge from the thickener to the digester may be continued, or it may be discontinued while allowing thickened sludge to be stored in the thickener. Furthermore, by thus temporarily recycling the additional fines from the centrifuge directly into the digester, the thickener and/or the clarification station are protected against loads that might be detrimental to their efficiency.

Whereas the present invention will serve to increase the capacity of the digester, in the manner above set forth, in cases where the raw sludge supply exceeds the digester capacity, the excess may be introduced directly into the centrifuge, and the resulting mixture of digested sludge solids and raw solids may then be disposed of together by combustion.

FIGS. 2 to 4 illustrate a practical manner of introducing the centrifuge overflow suspension into the sludge bed of a sedimentation tank or thickener for effecting the entrapment and retention therein of the solids as previously set forth, by way of induction conduit means incorporated in the rotary rake structure.

In the embodiment of FIG. 2, such induction means are embodied in a type of settling tank which may be the thickener 27 (see FIG. 1) wherein a rotary rake structure 71 has a vertical hollow shaft 72 and rake arms 73 connected therewith. The top end portion 74 of the shaft is mounted for rotation upon a horizontal beam construction 75 extending transversely of a tank 76 which has a feedwell 77 supplied by a feed conduit 78 (corresponding to conduit 14 in FIG. 1). The vertical shaft is connected to a conventional drive head 79 whereby it is supported from the beam construction. The hollow shaft has an upper exposed end 80 into which a supply or transfer pipe 81 delivers the overflow suspension from the centrifuge for discharge at points 82 and 83, for example, sufficiently deep in the sludge bed 84 for which there is a discharge 85 provided in the low point of the conical tank bottom 86. In this way the solids of the suspension get entrapped in the sludge while liquid therefrom finds its way upwardly to the overflow 87.

According to the embodiment in FIG. 3, a rotary rake structure 71a which may be similar to the one in FIG. 1, is provided with induction means for the centrifuge overflow suspension, comprising a special feedbox 88 surrounding the shaft 72a unitary therewith and located below the transverse beam construction 75a.

A transfer pipe 81a delivers the suspension from the centrifuge into this feedbox for discharge through down pipes 89 terminating at a suitable depth within the sludge bed 84a. A stationary feedwell cylinder 90 or the like surrounds the rotating feedwell 88, and is supplied by a feed conduit 91 (corresponding to feed conduit 14 in FIG. 1).

According to the embodiment in FIG. 4, the induction means are embodied in a type of settling tank which may be the clarifier 10 (see FIG. 1), wherein a rotary rake structure 92 has a central cage construction 93 surrounding a pier 94 and mounted for rotation of the rake structure on the pier. Conventional drive mechanism is also mounted on the pier, indicated at 95 for rotating the rake structure on the pier. The regular feed supply to this settling tank is shown to be by way of a supply duct underneath the tank bottom and up through the hollow pier for discharge through passages 96 for delivery into a feedwell 97 surrounding the cage construction and unitary with the rake structure to rotate therewith. Surrounding this feedwell 97 and in turn unitary therewith is an annular feed trough 98 to which a transfer pipe 99 (corresponding to line 48 in FIG. 1) supported upon a stationary radial bridge construction 100, delivers the centrifuge overflow suspension for discharge through a down pipe or pipes 101 terminating sufficiently deep within the sludge bed 102. In this way, the solids of the suspension become entrapped in the sludge while liquid separates finding its way upwardly to the overflow 103.

In summary, it will be seen that the digester operating circuit according to the invention as a net result delivers a well digested sludge, even though only incompletely digested sludge is discharged from the highly loaded digester itself, and that these results are attainable by selectively increasing the solids detention time relative to the liquor detention time in the digester. More in particular, this is accomplished by having the digester operating in circuit with the solid bowl centrifuge and with the thickener or settling tank, whereby the centrifuge discriminates between the digested sludge solids contained in a disposable cake material and the undigested matter contained in the overflow suspension returning to the thickener, and whereby the sludge bed in the thickener traps and retains the solids from the centrifuge overflow suspension for return into the digester together with the thickened sludge for conversion into gas.

Among the advantages resulting from the foregoing improvements are increased utilization of the available digester tank volume relative to the conventional, lower heat requirements for the digester contents, lower construction costs, reduction of labor and space requirements along with the elimination of sludge filters and/or sludge drying beds for digester sludge.

Where the raw sludge supply exceeds the available digester capacity, such excess sludge may be fed to the centrifuge along with the digester sludge for dewatering, and the resulting combined cake material may be disposed of by combustion.

It will furthermore be understood that each of the elements, or two or more together, may also find a useful application in other types of treatment systems differing from the type described above.

While the invention has been illustrated and described as embodied in a treatment system comprising clarification as well as a thickener, it is not intended to be limited to the details shown, since various modifications and structural as well as operational changes may be made without departing from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are to be intended to be comprehended within the meaning and range of equivalence of the following claims:

I claim:

1. A treatment system for the disposal through anaerobic digestion of a suspension of putrescible waste matter, which system comprises a continuously operating sedimentation tank having overflow means for separated liquor, a rotary rake structure acting upon sludge forming a sludge bed in the bottom zone of the tank subjacent to a body of separated liquid overflowing from the tank, means for feeding said suspension to said sedimentation tank, and means for discharging the thickened sludge from said sludge bed at a controllable rate;

a digestion station for containing a body of sludge undergoing digestion;

means for feeding sludge discharging from said bed to said body of digesting sludge;

means for withdrawing from said digestion station incompletely digested sludge;

a solid bowl type centrifugal machine having a solid rotor bowl with means adapted to discharge an overflow suspension from the wide end of the bowl and means for discharging centrifugally separated solids as a cake material transported to the narrow end of said bowl;

means for feeding said incompletely digested sludge to said solid bowl machine for effecting the separation and classification thereof into an overflow fraction containing largely the undigested matter of said incompletely digested sludge, and a concentrated portion of cake material containing other sludge solids substantially free of undigested matter with means for controlling the rate of feeding said incompletely digested sludge;

flow transfer means for supplying centrifuge overflow to said sedimentation tank and directly into said bed of sludge for causing the entrapment and retention therein of undigested solids of said centrifuge overflow while allowing liquid separating from said undigested solids to overflow from the tank, whereby the thus intercepted undigested solids are returned along with the raw sludge from said sludge bed to the said body of digesting sludge.

2. The treatment system according to claim 1, wherein said sedimentation tank is a primary clarifier tank.

3. The treatment system according to claim 1, wherein said rotary rake structure comprises a vertical hollow shaft supported for rotation from a superstructure extending transversely of the tank and rake arms extending from the lower end portion of the shaft, and wherein said transfer means comprise a conduit provided by said vertical shaft.

4. The treatment system according to claim 1, wherein said rotary rake structure comprises a vertical hollow shaft supported for rotation from a superstructure extending transversely of the tank and rake arms extending from the lower end portion of the shaft, and wherein said flow transfer means comprise a first conduit portion provided by said vertical shaft, and at least one radial conduit portion extending therefrom into said bed of sludge.

5. The treatment system according to claim 1, wherein said rotary rake structure comprises a vertical hollow shaft, supported for rotation from a superstructure extending transversely of the tank and rake arms extending from the lower end portion of the shaft, and wherein said flow transfer means comprise a first conduit portion provided by said vertical shaft and radial conduit portions extending from said shaft along said arms.

6. The treatment system according to claim 1, wherein said rotary rake structure comprises a vertical shaft supported for rotation from a superstructure extending transversely of the tank and rake arms extending from the lower end portion of the shaft, and wherein said flow transfer means comprise a conduit portion embodied in said vertical shaft, said shaft having fluid passage means in the wall thereof spaced downwardly from the liquid level in the tank, whereby liquid may flow through said passage means and said shaft.

7. The treatment system according to claim 1, wherein said rotary rake structure comprises a vertical shaft supported for rotation from a superstructure extending transversely of the tank, and rake arms extending from the lower end portion of the shaft, and wherein said flow transfer means comprise a feedwell surrounding said shaft and connected thereto for receiving said centrifuge overflow, and conduit means extending from said feedwell into said bed of sludge.

8. The treatment system according to claim 1, wherein said sedimentation tank has a center pier and a rake structure including a central cage portion surrounding the pier and supported thereon for rotation of the rake structure, and wherein said flow transfer means comprise an annular feed trough surrounding said cage portion and supported by said rake structure for receiving said centrifuge overflow, and at least one conduit extending downwardly from said annular feed trough for delivery of said centrifuge overflow into said bed of sludge.

9. The treatment system according to claim 1, with the addition of means for adding coagulating chemical to the incompletely digested sludge to effect the incorporation of digested fines into the cake material discharging from the centrifuge.

10. The treatment system according to claim 1, with the addition of means for recycling at least a portion of the overflow from the centrifuge into the digester.

11. The treatment system according to claim 1, with the addition of means for operating the centrifuge intermittently, and overflow means for the digester, effective when the centrifuge is at rest.

12. A treatment system for the disposal through anaerobic digestion of a suspension of putrescible waste material, which system comprises a continuously operating clarification station producing dilute sludge as underflow and clarified liquor as overflow, a continuously operating thickening tank having overflow means for separated liquor, and adapted to form a bed of thickened sludge of substantial depth in the bottom zone of the tank, providing a sludge reservoir subjacent to a body of separated liquid overflowing from the tank, means for feeding said dilute sludge to said thickening tank, and means for discharging thickened sludge from said bed at a controllable rate;

a digestion station for containing a body of sludge undergoing digestion;

means for feeding sludge discharging from said bed in the thickening tank to said body of digesting sludge;

means for withdrawing from said digestion station incompletely digested sludge;

a solid bowl type centrifugal machine having a conically shaped rotor bowl with means adapted to discharge an overflow suspension from the wide end of the bowl and for discharging centrifugally separated solids as a cake material transported to the narrow end of said bowl;

means for feeding said incompletely digested sludge to said solid bowl machine for effecting the separation and classification thereof into an overflow fraction containing largely the undigested matter of said incompletely digested sludge, and a concentrated portion of cake material containing other sludge solids substantially free of undigested matter, with means for controlling the rate of feeding said incompletely digested sludge;

flow transfer means for supplying centrifuge overflow to said thickening tank directly into said bed of sludge for causing the entrapment and retention therein of undigested solids while allowing liquid separating from said undigested solids to overflow from the tank, whereby the thus intercepted undigested solids are returned along with the raw sludge from said sludge bed to said body of digesting sludge.

13. The treatment system according to claim 12, with the addition of means for applying coagulating chemical to the incompletely digested sludge, to effect the incorporation of digested fines into the cake material discharging from the centrifuge.

14. The treatment system according to claim 12, with the addition of means for recycling at least a portion of the overflow from the centrifuge into the digester.

15. The treatment system according to claim 12, with the addition of means for operating the centrifuge intermittently, and overflow means for the digester, effective when the centrifuge is at rest.

16. A treatment system for the disposal of dilute sewage sludge through anaerobic digestion, which comprises a continuously operating thickening tank having overflowing means for separated liquor, and adapted to form a bed of thickened sludge of substantial depth in the bottom zone of the tank, providing a sludge reservoir subjacent to a body of separated liquid overflowing from the tank, means for feeding said dilute sludge to said thickening tank, and means for discharging thickened sludge from said bed at a controllable rate;

a digestion station for containing a body of sludge undergoing digestion;

means for feeding sludge discharging from said bed in the thickening tank to said body of digesting sludge;

means for withdrawing from said digestion station incompletely digested sludge;

a solid bowl type centrifugal machine having a solid rotor bowl with means adapted to discharge an overflow suspension from the wide end of the bowl and means for discharging centrifugally separated solids as a cake material transported to the narrow end of said bowl;

means for feeding said incompletely digested sludge to said solid bowl machine for effecting the separation and classification thereof into an overflow fraction containing largely the undigested matter of said incompletely digested sludge, and a concentrated portion of cake material substantially containing other sludge solids substantially free of undigested matter, with means for controlling the rate of feeding said incompletely digested sludge;

flow transfer means for supplying centrifuge overflow to said thickening tank directly into said bed of sludge for causing the entrapment and retention therein of undigested solids while allowing liquid separating from said undigested solids to overflow from the tank, whereby the thus intercepted undigested solids are returned along with the raw sludge from said sludge bed to said body of digesting sludge.

17. The treatment system according to claim 16, with the addition of means for applying coagulating chemical to the incompletely digested sludge, to effect the incorporation of digested fines into the cake material discharging from the centrifuge.

18. The treatment system according to claim 16, with the addition of means for recycling at least a portion of the overflow from the centrifuge into the digester.

19. The treatment system according to claim 16, with the addition of means for operating the centrifuge intermittently, and overflow means for the digester, effective when the centrifuge is at rest.

20. The method of disposal of a suspension of putrescible waste matter through anaerobic digestion, which comprises subjecting the suspension to continuous sedimentation to form a sludge bed subjacent to a body of separated liquor;

maintaining a body of digesting sludge;

feeding sludge from said sludge bed to said body of digesting sludge at a rate adapted to produce incompletely digested sludge for discharge from the digester;

subjecting incompletely digested sludge discharged from said body of digesting sludge to centrifugal separation treatment controlled for delivering a cake material substantially containing the digested solids, and an overflow substantially containing the undigested solids;

and introducing said overflow directly into said bed of sludge to effect entrapment and retention therein of undigested solids.

21. The method of disposal according to claim 20, which comprises applying coagulating chemical to the incompletely digested sludge, to effect the incorporation of digested fines into the cake material discharging from the centrifuge.

22. The method of disposal according to claim 20, which comprises conducting said centrifugal separating treatment intermittently, discharging excess liquor from said body of digesting sludge during interruption of said centrifugal separating treatment, and recycling excess overflow from said centrifugal separating treatment directly to said body of digesting sludge.

23. The method of disposal according to claim 20, which comprises for short periods significantly increasing the rate of supplying said incompletely digested sludge to said centrifugal separation treatment, so controlled as to purge said body of digesting sludge of accumulated digested and undigestible material.

References Cited by the Examiner

UNITED STATES PATENTS

| | | | |
|---|---|---|---|
| 2,360,811 | 10/1944 | Kelly et al. | 210—8 |
| 2,596,616 | 5/1952 | Strezynski | 233—18 |
| 2,685,369 | 8/1954 | Crossley. | |
| 2,777,815 | 1/1957 | Forrest | 210—3 |
| 2,850,449 | 9/1958 | Torpey | 210—10 |

FOREIGN PATENTS 1,162,158   4/1958   France.

OTHER REFERENCES

McNary et al., Experimental Treatment of Citrus Waste Water, Proc. Eighth Ind. Waste Conf., Purdue Univ. (1953), pp. 256–274.

Torpey, Loading to Failure of a Pilot High-Rate Digester, Sew. and Ind. Wastes, February 1955, vol. 27, pp. 121–148; pp. 121–123 particularly relied on.

MORRIS O. WOLK, *Primary Examiner.*